United States Patent
Wuidart

(10) Patent No.: US 7,046,121 B2
(45) Date of Patent: *May 16, 2006

(54) DETECTION OF AN ELECTRIC SIGNATURE OF AN ELECTROMAGNETIC TRANSPONDER

(75) Inventor: Luc Wuidart, Pourrieres (FR)

(73) Assignee: STMicroelectronics S.A., Montrouge (FR)

(*) Notice: Subject to any disclaimer, the term of this patent is extended or adjusted under 35 U.S.C. 154(b) by 342 days.

This patent is subject to a terminal disclaimer.

(21) Appl. No.: 10/343,775

(22) PCT Filed: Aug. 9, 2001

(86) PCT No.: PCT/FR01/02591

§ 371 (c)(1),
(2), (4) Date: Mar. 6, 2003

(87) PCT Pub. No.: WO02/13124

PCT Pub. Date: Feb. 14, 2002

(65) Prior Publication Data

US 2003/0164742 A1     Sep. 4, 2003

(30) Foreign Application Priority Data

Aug. 9, 2000 (FR) .................................. 00/10476

(51) Int. Cl.
H04Q 5/22 (2006.01)
G08B 13/14 (2006.01)
H04B 17/00 (2006.01)
H03C 1/52 (2006.01)

(52) U.S. Cl. ............... 340/10.1; 340/572.5; 455/67.11; 455/106; 455/107

(58) Field of Classification Search ............... 340/10.1, 340/10.4, 10.41, 572.5; 455/67.11, 106, 455/107

See application file for complete search history.

(56) References Cited

U.S. PATENT DOCUMENTS

| | | |
|---|---|---|
| 2,411,555 A | 11/1946 | Rogers |
| 3,618,089 A | 11/1971 | Moran, Jr. |
| 4,068,232 A | 1/1978 | Meyers et al. |
| 4,209,783 A | 6/1980 | Ohyama et al. |
| 4,258,348 A | 3/1981 | Belfer et al. |

(Continued)

FOREIGN PATENT DOCUMENTS

EP  0 369 622 A2  5/1990

(Continued)

OTHER PUBLICATIONS

International Search Report from PCT priority application No. PCT/FR01/02591.

(Continued)

Primary Examiner—Brian Zimmerman
Assistant Examiner—Clara Yang
(74) Attorney, Agent, or Firm—Lisa K. Jorgenson; James H. Morris; Wolf, Greenfield & Sacks, P.C.

(57) ABSTRACT

The invention concerns a terminal generating a high-frequency electromagnetic field by means of an oscillating circuit, adapted to co-operate with at least a transponder when the latter enters said field, comprising means (37) for regulating the phase of the signal in the oscillating circuit with respect to a reference value, and means for detecting, on the basis of a current measurement in the oscillating circuit and a voltage measurement at the terminals of a capacitive element (31) of said oscillating circuit, an electric signature of a transponder.

34 Claims, 6 Drawing Sheets

U.S. PATENT DOCUMENTS

| | | | |
|---|---|---|---|
| 4,278,977 A | 7/1981 | Nossen | |
| 4,375,289 A | 3/1983 | Schmall et al. | |
| 4,408,185 A | 10/1983 | Rasmussen | |
| 4,593,412 A | 6/1986 | Jacob | |
| 4,656,472 A | 4/1987 | Walton | |
| 4,660,192 A | 4/1987 | Pomatto, Sr. | |
| 4,673,932 A | 6/1987 | Ekchian et al. | |
| 4,706,050 A | 11/1987 | Andrews | |
| 4,782,308 A | 11/1988 | Trobec et al. | |
| 4,802,080 A | 1/1989 | Bossi et al. | |
| 4,814,595 A | 3/1989 | Gilboa | |
| 4,827,266 A | 5/1989 | Sato et al. | |
| 4,928,108 A | 5/1990 | Kropielnicki et al. | |
| 4,963,887 A | 10/1990 | Kawashima et al. | |
| 5,013,898 A | 5/1991 | Glasspool | |
| 5,055,853 A | 10/1991 | Garnier | |
| 5,084,699 A | 1/1992 | DeMichele | |
| 5,099,227 A | 3/1992 | Geiszler et al. | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |
| 5,235,326 A * | 8/1993 | Beigel et al. ............ | 340/10.41 |
| 5,305,008 A | 4/1994 | Turner et al. | |
| 5,324,315 A | 6/1994 | Grevious | |
| 5,451,958 A * | 9/1995 | Schuermann ................ | 342/42 |
| 5,452,344 A | 9/1995 | Larson | |
| 5,493,267 A | 2/1996 | Ahlse et al. | |
| 5,504,485 A | 4/1996 | Landt et al. | |
| 5,519,381 A | 5/1996 | Marsh et al. | |
| 5,521,602 A | 5/1996 | Carroll et al. | |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A | 12/1997 | Murdoch | |
| 5,703,573 A | 12/1997 | Fujimoto et al. | |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflügl et al. | |
| 6,034,640 A | 3/2000 | Oida et al. | |
| 6,070,803 A | 6/2000 | Stobbe | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A | 8/2000 | Frary | |
| 6,137,411 A | 10/2000 | Tyren | |
| 6,150,986 A | 11/2000 | Sandberg et al. | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,304,169 B1 | 10/2001 | Blama et al. | |
| 6,307,468 B1 | 10/2001 | Ward, Jr. | |
| 6,307,517 B1 | 10/2001 | Lee | |
| 6,335,665 B1 | 1/2002 | Mendelsohn | |
| 6,393,045 B1 | 5/2002 | Belcher et al. | |
| 6,424,820 B1 | 7/2002 | Burdick et al. | |
| 6,441,804 B1 | 8/2002 | Hsien | |
| 6,446,049 B1 | 9/2002 | Janning et al. | |
| 6,465,903 B1 | 10/2002 | Wuidart et al. | |
| 6,473,028 B1 | 10/2002 | Luc | |
| 6,476,709 B1 | 11/2002 | Wuidart et al. | |
| 6,491,230 B1 | 12/2002 | Dubost et al. | |
| 6,498,923 B1 | 12/2002 | Ikefuji et al. | |
| 6,547,149 B1 | 4/2003 | Wuidart et al. | |
| 6,617,962 B1 * | 9/2003 | Horwitz et al. ............ | 340/10.4 |
| 6,646,543 B1 | 11/2003 | Mardinian et al. | |
| 6,650,226 B1 | 11/2003 | Wuidart et al. | |
| 6,650,227 B1 | 11/2003 | Bradin | |
| 6,650,229 B1 | 11/2003 | Wuidart et al. | |
| 6,654,466 B1 | 11/2003 | Ikefuji et al. | |
| 6,690,229 B1 | 2/2004 | Rudolph | |
| 6,703,921 B1 | 3/2004 | Wuidart et al. | |
| 6,879,246 B1 * | 4/2005 | Wuidart ..................... | 340/10.2 |
| 2002/0008611 A1* | 1/2002 | Wuidart ..................... | 340/10.1 |
| 2002/0008612 A1* | 1/2002 | Wuidart ..................... | 340/10.4 |
| 2003/0227323 A1 | 12/2003 | Enguent | |

FOREIGN PATENT DOCUMENTS

| | | |
|---|---|---|
| EP | 0 568 067 A1 | 11/1993 |
| EP | 0 579 332 A1 | 1/1994 |
| EP | 0 645 840 A1 | 3/1995 |
| EP | 0 768 540 A1 | 4/1997 |
| EP | 0 857 981 A1 | 8/1998 |
| EP | 0 902 475 A2 | 3/1999 |
| GB | 2 298 553 A | 9/1996 |
| GB | 2 321 726 A | 8/1998 |
| JP | 407245946 A | 9/1995 |
| JP | 10-145267 | 5/1998 |
| JP | 10-203066 | 8/1998 |
| WO | WO 93/17482 A3 | 9/1993 |
| WO | WO 98/20363 A1 | 5/1998 |
| WO | WO 99/33017 A1 | 7/1999 |
| WO | WO 99/43096 A1 | 8/1999 |

OTHER PUBLICATIONS

French Search Report from French Patent Application No. 98 08024, filed Jun. 22, 1998.

French Search Report from French Patent Application No. 98 08025, filed Jun. 22, 1998.

French Search Report from French Patent Application No. 99 04544, filed Apr. 7, 1999.

French Search Report from French Patent Application No. 99 04545, filed Apr. 7, 1999.

French Search Report from French Patent Application No. 99 04546, filed Apr. 7, 1999.

French Search Report from French Patent Application No. 99 04547, filed Apr. 7, 1999.

French Search Report from French Patent Application No. 99 04548, filed Apr. 7, 1999.

French Search Report from French Patent Application No. 99 04549, filed Apr. 7, 1999.

French Search Report from French Patent Application No. 99 07024, filed May 31, 1999.

French Search Report from French Patent Application No. 99 09563, filed Jul. 20, 1999.

French Search Report from French Patent Application No. 99 09564, filed Jul. 20, 1999.

French Search Report from French Patent Application No. 00 01214, filed Jan. 31, 2000.

French Search Report from French Patent Application No. 00 06061, filed May 12, 2000.
French Search Report from French Patent Application No. 00 06064, filed May 12, 2000.
French Search Report from French Patent Application No. 00 06065, filed May 12, 2000.
French Search Report from French Patent Application No. 00 06071, filed May 12, 2000.
French Search Report from French Patent Application No. 00 06301, filed May 17, 2000.
French Search Report from French Patent Application No. 00 06302, filed May 17, 2000.
International Search Report from International Patent Application No. PCT/FR 01 02621, filed Aug. 16, 2001.

* cited by examiner

DETECTION OF AN ELECTRIC SIGNATURE OF AN ELECTROMAGNETIC TRANSPONDER

BACKGROUND OF THE INVENTION

1. Field of the Invention

The present invention relates to systems using electromagnetic transponders, that is, transmitters and/or receivers (generally mobile) capable of being interrogated in a contactless and wireless manner by a unit (generally fixed), called a read and/or write terminal. Generally, transponders extract the power supply required by the electronic circuits included therein from a high-frequency field radiated by an antenna of the read-write terminal.

2. Discussion of the Related Art

FIG. 1 very schematically shows a conventional example of a data exchange system between a read/write terminal 1 and a transponder 10 of the type to which the present invention applies.

Generally, terminal 1 is essentially formed of a series oscillating circuit formed of an inductive resistor L1 in series with a capacitor C1 and a resistor R1. This series oscillating circuit is controlled by a device 2 including, among others and non-limitingly, an amplifier or antenna coupler, and a control circuit exploiting received data, especially provided with a modulator/demodulator and a microprocessor for processing the control signals and the data. Circuit 2 generally communicates with different input/output circuits (keyboard, screen, means of exchange with a server, etc.) and/or processing circuits, not shown. The circuits of the read/write terminal generally draw the power necessary for their operation from a supply circuit (not shown) connected, for example, to the electric supply system.

A transponder 10, intended for cooperating with a terminal 1, essentially includes a parallel oscillating circuit formed of an inductive resistor L2, in parallel with a capacitor C2 between two input terminals 11, 12 of a control and processing circuit 13. Terminals 11, 12 are in practice connected to the input of a rectifying means (not shown), outputs of which form D.C. supply terminals of the circuits internal to the transponder. These circuits generally include, essentially, a microprocessor, a demodulator of the signals that may be received from terminal 1, and a modulator for transmitting information to the terminal.

The oscillating circuits of the terminal and of the transponder are generally tuned on the same frequency corresponding to the frequency of an excitation signal of the terminal's oscillating circuit. This high-frequency signal (for example, at 13.56 MHz) is not only used as a transmission carrier but also as a remote supply carrier for the transponder(s) located in the terminal's field. When a transponder 10 is located in the field of a terminal 1, a high-frequency voltage is generated across terminals 11 and 12 of the transponder's resonant circuit. This voltage, after being rectified and possibly clipped, is intended for providing the supply voltage of electronic circuits 13 of the transponder.

The high-frequency carrier transmitted by the terminal is generally modulated in amplitude by said terminal according to different coding techniques to transmit data and/or control signals to one or several transponders in the field. In return, the transmission of data from the transponder to a terminal is generally performed by modulating the load formed by resonant circuit L2, C2. This load variation is performed at the rate of a sub-carrier having a frequency (for example, 847.5 kHz) smaller than that of the carrier. This load variation can then be detected by the terminal in the form of an amplitude variation or of a phase variation by means, for example, of a measurement of the voltage across capacitor C1 or of the current in the oscillating circuit.

When idle, that is, when no transponder has entered its field, a terminal 1 periodically transmits a data message modulated on the high-frequency signal. This message is a request message intended for possible transponders. This request, or general call, belongs to a process needed for the initialization of a communication between a transponder and a terminal.

A difficulty in establishing a communication to one or several transponders is due to the fact that several electromagnetic transponders may be simultaneously located in the terminal's field.

Another difficulty is that transponders of different types or families (for example, transportation card, access card, electronic purse) use the same frequencies and, at least partly, the same communication protocols, which are normalized. Accordingly, a terminal must be able to determine, not only the number of transponders present in its field, but also the type of transponders, to select that or those with which it must communicate.

Such constraints require a loop operation of a control program of the terminal until all the transponders present in its field have been properly identified.

FIG. 2 schematically shows, in a simplified manner, a flowchart of initialization of one or several communications by a read-write terminal of the type to which the present invention applies.

After a starting, initialization and testing phase, a read-write terminal 1 of transponders starts (block 20, ST) a stand-by procedure during which it waits for the completion of a communication with at least one transponder. This procedure includes periodically sending (block 21) a request sequence (REQ) to the possible transponders present in the terminal's field. Upon each sending of an interrogation request 21, the reader monitors (block 22) the reception by its demodulator of an acknowledgement message (ATQ) coming from a transponder having entered its field. In the absence of any acknowledgement, the reader loops on the sending of a request 21. When its receives an acknowledgement ATQ, it switches to a mode of checking whether the transponder really is a transponder intended for it (block 23, TYPE), as well as to a possible anti-collision mode (block 24, ANTICOLLISION) to individualize several transponders that may be present in the field. Indeed, if several transponders are present in the terminal's field, they may respond at the same time or with a sufficiently short time interval to make the result of the demodulation by the reader unexploitable. Said reader must then either select a transponder with which it wishes to communicate, or assign different channels to the different transponders.

A communication only starts when the initialization and anti-collision process illustrated in FIG. 2 is over (block 26, E), that is, when the reader has detected (block 25, ALL) that it has identified all the transponders present in its field. Determining that a transponder belongs to a given family is part of this identification. As long as all the transponders have not been identified, interrogation requests are sent. If a transponder has been properly identified, it is placed in a state where it no longer acknowledges interrogation requests to avoid polluting the detection of the other possible transponders.

An initialization and anti-collision process such as briefly described in relation with FIG. 2 is well known. Illustrations of conventional methods are for example to be found in French patent applications no. 2,760,280 and 2,773,627 which are incorporated herein by reference.

The method illustrated in FIG. 2 is most often implemented by setting the maximum number of cards likely to be present in the transponder's field. As described, in particular, in French patent application No. 2,760,280, this number can be modified by the reader according to the results of exploitation of the anti-collision process (block 24) to increase the detection probabilities and to reduce the duration of the initialization process.

A disadvantage of conventional systems is that the determinations of the number and/of the type of transponders use a transmission of messages by the transponders. To determine the transponder's family, a software-implemented comparison of an identification transmitted by the transponder is used. In addition to the problems of program execution time, it is thus not checked whether the software identification is transmitted by a transponder or by a pirate device placed close to the terminal.

SUMMARY OF THE INVENTION

The present invention aims at overcoming the disadvantages and at solving the problems posed by known systems in relation with the identification of one or several transponders in the field of a terminal.

The present invention more specifically aims at providing a novel mode of identification of an electromagnetic transponder which is not based on an analysis of a transmitted data message.

The present invention also aims at reducing the time required for the initialization and the completion of communications between a read-write terminal of electromagnetic transponders and one or several transponders having entered its field. In other words, the present invention aims at reducing the duration necessary for the determination and the identification, by the read-write terminal, of all the transponders present at a given time in its field.

The present invention further aims at providing a solution that does not require use of the detection results of the terminal's demodulator.

To achieve these and other objects, the present invention provides a terminal for generating a high-frequency electromagnetic field by means of an oscillating circuit, adapted to cooperating with at least one transponder when said transponder enters this field, and including:

means for regulating the signal phase in the oscillating circuit with respect to a reference value; and means for detecting, based on a measurement of the current in the oscillating circuit and on a measurement of the voltage across a capacitive element of this oscillating circuit, an electric signature of a transponder.

According to an embodiment of the present invention, the electric signature enables determining the type to which the transponder belongs from among a set of types identified by characteristic manufacturing parameters.

According to an embodiment of the present invention, the terminal includes means for comparing the signature of a transponder having entered its field with at least one signature sample stored in a learning phase.

According to an embodiment of the present invention, the terminal includes means for determining and storing characteristic information relative to the voltages across the capacitive element of its oscillating circuit and to the currents in this oscillating circuit, in several determined configurations of the distance separating a reference transponder from the terminal, and for taking into account this characteristic information to determine the transponder's signature.

According to an embodiment of the present invention, said characteristic information includes, among other things:

the voltage across the capacitive element when no transponder is present in the terminal's field;

the voltage across the capacitive element when a transponder is in a relation of maximum closeness with the terminal;

the current in the oscillating circuit when no transponder is present in the terminal's field; and the current in the oscillating circuit when a transponder is in a relation of maximum closeness with the terminal.

According to an embodiment of the present invention, the signature detection is performed without interpreting any data message carried by the high-frequency field.

According to an embodiment of the present invention, the terminal includes means for evaluating, based on the measurement of the current in the oscillating circuit, the minimum number of transponders present in the field.

According to an embodiment of the present invention, the terminal further includes means for, based on the measurement of the voltage across the capacitive element of the oscillating circuit, evaluating the maximum number of transponders present in the terminal's field.

The present invention also provides a method for establishing at least one communication between a terminal of generation of a high-frequency magnetic field and an electromagnetic transponder, including determining the type of a transponder from among a set of types identified by characteristic electric parameters, before exchanging any data message between the transponder and the terminal.

According to an embodiment of the present invention, said determination includes of comparing the current measured in the terminal's oscillating circuit and the voltage across a capacitive element of this oscillating circuit with previously calculated and stored values to establish the set of identified types.

According to an embodiment of the present invention, the method includes periodically sending a request sequence until at least one transponder entering the field sends an acknowledgement, and evaluating based on the current measurement a minimum number of transponders likely to be present in the field.

According to an embodiment of the present invention, the method further includes, based on the evaluation of the minimum number and on a measurement of the voltage, evaluating the maximum number of transponders likely to be present in the terminal's field.

The foregoing objects, features and advantages of the present invention, will be discussed in detail in the following non-limiting description of specific embodiments in connection with the accompanying drawings.

DETAILED DESCRIPTION

Figure 1:
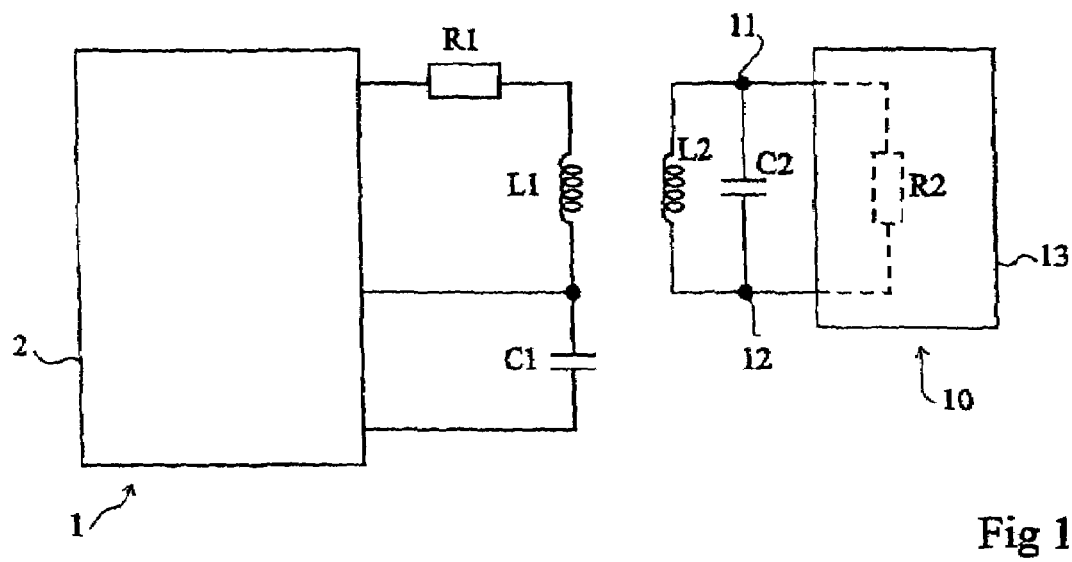
FIGS. 1 and 2, previously described, are intended to show the state of the art and the problem to solve.

The same elements have been referred to with the same reference characters in the different drawings. For clarity, the characteristics of FIGS. 4 and 8 have been drawn out of scale and only those elements of a terminal or of a transponder and those steps of the method which are necessary to the understanding of the present invention have been illustrated in the drawings and will be described hereafter. In particular, the means used to implement the calculations in the method of the present invention have not been detailed, since it is conventional. It may be, for example, the microprocessor generally provided in a read-write terminal. Further, reference will often be made to "cards" to designate transponders. The present invention however applies whatever the type of transponder, be it or not provided with a microprocessor (card of credit card type, electronic label, etc.).

A feature of the present invention is to provide an identification of a so-called electric signature of a transponder. Each transponder type has specific electric characteristics that are determined by its manufacturing based on integrated circuit manufacturing technologies. These characteristics are linked to the sizing (shape and size) of the inductive resistor and capacitor of the transponder's resonant circuit. Once the transponder has been manufactured, these characteristics cannot be changed (neglecting the influence of the component aging). Further, the very characteristics of the resonant circuit influence the oscillating circuit of a terminal. Accordingly, it can be considered that each transponder family has its "signature" from the point of view of its oscillating circuit. Further, advantage can be taken of the technological dispersions of these components between manufacturing batches to individualize transponder families. Such dispersions are however negligible within a same batch, or at least on a same wafer.

Another feature of the present invention is to provide a determination of the family to which the transponder present in the field of a read-write terminal belongs, based on physical measurements performed on the terminal's oscillating circuit. More specifically, the values of the current in the terminal's oscillating circuit and the voltage across the capacitor of this oscillating circuit are compared to values measured and/or calculated in a learning phase that precedes putting the terminal into service.

According to the present invention, the determination of the transponder type is performed (upstream of the demodulator) without requiring exploitation of the received data signal (that is, downstream of the terminal's demodulator). The present invention provides evaluating this number based on the sole electric current and voltage determinations, and on calculations of these variables.

Determining the family to which a transponder belongs without it being necessary to interpret (to demodulate) a data message considerably improves the system security. Indeed, to be "accepted" by the terminal, the transponder must have the same characteristics as a reference transponder. This means that the pirate transponder has to have the same structure (to be manufactured in the same way in integrated form) as a valid transponder. Now, it is more difficult to reproduce intrinsic electric characteristics (linked to the technology used and to the integration method) than data message characteristics. Risks of fraud are thus considerably reduced.

Another feature of the present invention is to provide a phase regulation of the terminal's oscillating circuit with respect to a reference value. According to the present invention, this phase regulation is performed by means of a loop. The response time of this loop is chosen to be sufficiently long to avoid disturbing the possible back modulation from a transponder and to be sufficiently short as compared to the passing speed of a transponder in the terminal's field. This can be called a static regulation with respect to the modulation frequencies (for example, the 13.56-MHz remote supply carrier frequency and the 847.5-kHz back-modulation frequency used in the data transmission from the transponder to the terminal).

The phase regulation enables reliable exploitation of the performed measurements of physical variables. Indeed, the load formed by a transponder on the oscillating circuit depends on the distance separating this transponder from the terminal. Now, the variation range, evaluated across the capacitor of the terminal's oscillating circuit (capacitor C1, FIG. 1) depends on the tuning of this oscillating circuit as well as on the tuning of the transponder's oscillating circuit on the remote supply carrier frequency. Now, in conventional circuits, the tuning is not perfect. In particular, in conventional circuits, the tuning of the resonance frequency to the carrier frequency is performed manually by means of a variable capacitor, once the terminal has been manufactured. The tuning requires adjusting, especially, due to manufacturing tolerances of capacitive and inductive elements, to guarantee the chosen phase operating point between a reference signal provided by an oscillator of the terminal and the received signal, sampled for example across capacitor C1. A detuning of the terminal's oscillating circuit has several consequences and, in particular, that of modifying the signal amplitude in this oscillating circuit and, accordingly, modifying the amplitude of the signal available for a possible evaluation.

Figure 3:
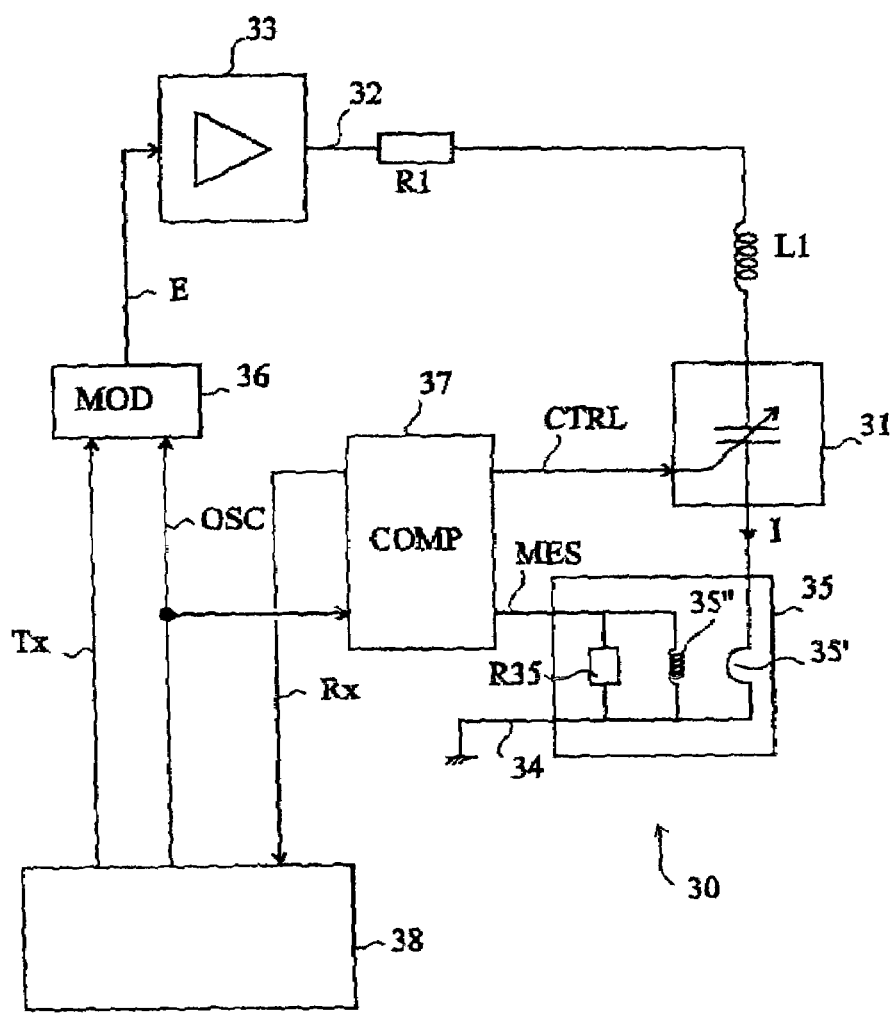
FIG. 3 shows, in the block diagram form, an embodiment of an electromagnetic transponder read-write terminal according to the present invention.

FIG. 3 shows in the form of blocks an embodiment of a terminal 30 according to the present invention, equipped with a phase regulation loop of the oscillating circuit.

Conventionally, terminal 30 includes an oscillating circuit formed of an inductive resistor or antenna L1, in series with a capacitive element 31 and a resistive element R1, between an output terminal 32 of an amplifier or antenna coupler 33 and a terminal 34 at a reference potential (generally, ground). An element 35 for measuring the current in the oscillating circuit is interposed, for example, between capacitive element 31 and ground 34. Measurement element 35 belongs to the phase regulation loop, which will be described hereafter. Amplifier 33 receives a high-frequency transmission signal E, coming from a modulator 36 (MOD), which receives a reference frequency (signal OSC), for example, from a quartz oscillator (not shown). Modulator 36 receives, if necessary, a signal Tx of data to be transmitted and, in the absence of any data transmission from the terminal, provides the high-frequency carrier (for example at 13.56 MHz) adapted to remotely supplying a transponder. Capacitive element 31 is a variable-capacitance element controllable by a signal CTRL.

In terminal 30, a phase regulation of the current in antenna L1 is performed with respect to a reference signal. This regulation is a regulation of the high-frequency signal, that is, of the carrier signal corresponding to signal E in the absence of data to be transmitted. This regulation is performed by varying the capacitance of the oscillating circuit of terminal 30 to maintain the current in the antenna in a constant phase relation with the reference signal. This reference signal corresponds, for example, to signal OSC provided by the modulator's oscillator. Signal CTRL originates from a circuit 37 (COMP) having the function of detecting the phase interval with respect to the reference signal and accordingly modifying the capacitance of element 31. The phase measurement is performed, for example, from a measurement of current I in the circuit by means of current transformer 35 connected in series with element 31. This transformer generally is formed of a primary winding 35' between element 31 and terminal 34, and of a secondary winding 35'', a first terminal of which is directly connected to ground 34 and a second terminal of which supplies a signal MES providing the result of the measurement. A current-to-voltage conversion resistor R35 is connected in parallel with secondary winding 35''. The result of measurement MES is sent to comparator 37, which accordingly controls capacitive element 31 by means of signal CTRL.

According to the preferred embodiment illustrated in FIG. 3, comparator 37 uses the same phase demodulator (not shown) as that which is used to demodulate the signal coming from the transponder, possibly received by the oscillating circuit. Accordingly, comparator 37 provides a signal Rx restoring a possible back modulation of data received from a transponder to a block 38 symbolizing the rest of the terminal's electronic circuits.

The practical implementation of the phase regulation loop is within the abilities of those skilled in the art by using conventional means and based on the functional indications given hereabove. As an alternative to the current transformer of FIG. 3, other conventional measurement means may be used. An example of a phase regulation terminal is described in document EP-A-0,857,981.

Regulating the phase of the terminal's oscillating circuit on a reference value enables getting rid of possible problems of sizing tolerances for the oscillating circuit components and of the drift of these components in operation. This further enables performing reliable measurements relative to the magnetic coupling between the terminal's oscillating circuit and that of one or several transponders which is incorporated herein by reference.

Current and voltage measurements in the terminal's oscillating circuit can now be exploited to deduce therefrom, according to the present invention, information relative to the transponder type. This information takes into account, in particular, the coupling between each of the cards and the terminal, that is, the coupling coefficient between the terminal's oscillating circuit and that of one of the cards. This coupling coefficient essentially depends on the distance separating the transponder from the terminal. Coupling coefficient k between the oscillating circuits of a transponder and of the terminal is always between 0 and 1. The distance separating the antennas from the oscillating circuits is, as a first approximation, proportional to 1-k. Accordingly, in the following description, reference will be made either to distance or to the coupling coefficient.

In an application of the present invention in which several transponders are likely to be present at the same time in the field of a terminal, another feature is to also provide an evaluation of the number of cards present in the terminal's field. According to the present invention, this determination is here again performed based on physical measurements performed on the terminal's oscillating circuit. As for the signature determination, the number of cards in the terminal's field is evaluated by comparing the values of the current in the terminal's oscillating circuit and the voltage across the capacitor of this oscillating circuit to values measured and/or calculated in a learning phase that precedes putting the terminal into service.

Figure 2:
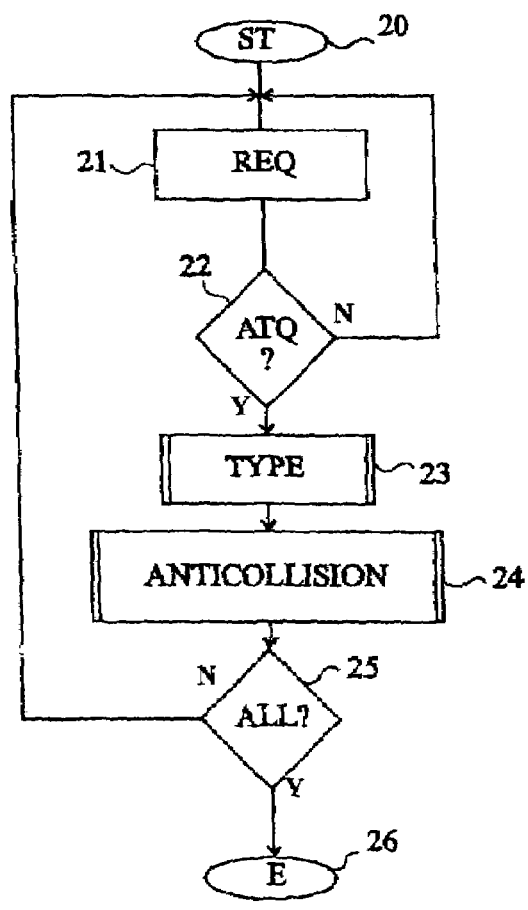

The evaluation of this number of transponders, without requiring exploitation of the received data signal, considerably reduces the number of loops of the communication initialization method (FIG. 2). Indeed, even if a method dynamically adapting the number of loops based on the measurements is used, the initial number taken into account is refined as compared to a conventional implementation.

The present invention originates from an interpretation of different relations linking the electric variables measurable by the terminal in different operating configurations with one or several transponders.

In particular, current I in the terminal's series oscillating circuit (for example, measured by transformer 35) is linked to the so-called generator voltage (noted Vg) exciting the oscillating circuit, and to the apparent impedance $Z1_{app}$ of the oscillating circuit, by the following relation:

$$I = \frac{Vg}{Z1_{app}}. \qquad \text{(formula 1)}$$

Further, the fact of regulating the oscillating circuit phase on a reference value enables the distance variation of a transponder entering the terminal's field to only translate as a modification of the real part of the impedance of this oscillating circuit. Indeed, all variations which would tend to modify the imaginary part of this impedance by the load formed by the transponder (or the transponders) are compensated for by the phase regulation loop. Thus, it is ensured that, in static operation, the imaginary part of impedance $Z1_{app}$ is null. Accordingly, impedance $Z1_{app}$ becomes equal to apparent resistance $R1_{app}$ and can be expressed as:

$$Z1_{app} = R1_{app} = R1 + a^2 \frac{L2}{R2 \cdot C2}, \qquad \text{(formula 2)}$$

with:

$$a^2 = \frac{k^2 \cdot \omega^2 \cdot L1 \cdot L2}{X2^2 + \left(\frac{L2}{R2 \cdot C2}\right)^2}, \qquad \text{(formula 3)}$$

where ω represents the pulsation, X2 represents the imaginary part of the impedance of the transponder's oscillating circuit (X2=ωL2−1/ωC2), and where R2 represents the load formed by the transponder circuits on its own oscillating circuit, modeled in FIG. 1 by a resistor R2 shown in dotted lines, in parallel with inductive resistor L2 and capacitor C2. In other words, resistor R2 represents the equivalent resistor of all the transponder circuits (microprocessor, back-modulation means, etc.), added in parallel on capacitor C2 and inductive resistor L2. In above formula 2, the series resistance of inductive resistor L1, which adds to the two other terms, has been neglected. It may also be considered that the value of this series resistance is, for simplification, included in the value of resistance R1.

The above formulas 2 and 3 have been established in the case where a single transponder is present in the terminal's field. By combining formulas 1, 2, and 3, current I can be expressed as:

$$I = \frac{Vg}{R1 + k^2 \cdot \frac{\omega^2 \cdot L1 \cdot L2^2}{Z2^2 \cdot R2 \cdot C2}}. \quad \text{(formula 4)}$$

with:

$$Z2^2 = X2^2 + \left(\frac{L2}{R2 \cdot C2}\right)^2. \quad \text{(formula 5)}$$

In above expressions 4 and 5, only values Vg and k are likely to vary for a given terminal and transponders of a given family.

Among the measurements of electric variables that can be easily performed on the read-write terminal side, the present invention provides using off-load and maximum coupling values that correspond to the following cases.

The off-load values represent the current and the voltage when no transponder is present in the terminal's field. In this off-load operation, the apparent impedance $Z1_{off\text{-}load}$ of the terminal's oscillating circuit now only depends on components R1, L1, and C1 of the terminal. Further, since, due to the phase regulation, the imaginary part of this impedance is always null, one may write:

$$I_{off\text{-}load} = \frac{Vg}{R1}. \quad \text{(formula 6)}$$

Further, it is known that imaginary part $X1_{app}$ of apparent impedance $Z1_{app}$ can be expressed as:

$$X1_{app} = X1 - a^2 \cdot X2, \quad \text{(formula 7)}$$

with:

$$X1 = \omega \cdot L1 - \frac{1}{\omega \cdot C1}. \quad \text{(formula 8)}$$

Since imaginary part $X1_{app}$ is null, one can write:

$$X1 = a^2 \cdot X2. \quad \text{(formula 9)}$$

Based on these relations, the difference between the current and off-load values can be expressed as follows:

$$X1 - X1_{off\text{-}load} = a^2 \cdot X2 - a_{off\text{-}load}^2 \cdot X2. \quad \text{(formula 10)}$$

Now, coefficient $a_{off\text{-}load}$ is null since the off-load coupling is null. Further, voltage VC1 across element 31 (neglecting the influence of current transformer 35) can be written as $I/\omega C1$, I being, for example, measured by transformer 35. As a result, formula 10 hereabove can be written as:

$$a^2 \cdot X2 = \frac{VC1_{off\text{-}oad}}{I_{off\text{-}load}} - \frac{VC1}{1}. \quad \text{(formula 11)}$$

Another easy-to-determine operating condition corresponds to maximum coupling kmax. In this condition, that is, in a relation of minimum distance between a transponder and the terminal (for example, the transponder being laid on the terminal as close as possible to antenna L1), current $I_{max}$ in the terminal's oscillating circuit can be measured as a transponder of the involved family or type is laid on the terminal.

By applying formula 10 to the current value and to the maximum coupling, and by transferring these applications into formula 11, one may write, for a card:

$$\frac{a^2 \cdot X2}{a_{max}^2 \cdot X2} = \frac{\frac{VC1_{off\text{-}load}}{I_{off\text{-}load}} - \frac{VC1}{I}}{\frac{VC1_{off\text{-}load}}{I_{off\text{-}load}} - \frac{VC1_{max}}{I_{max}}}. \quad \text{(formula 12)}$$

Now, by applying formula 3 to the above formula, one obtains:

$$\frac{a^2 \cdot X2}{a_{max}^2 \cdot X2} = \frac{k^2}{k_{max}^2}. \quad \text{(formula 13)}$$

Thus, ratio $k/k_{max}$ between the current and maximum coupling coefficients can be expressed, when a transponder is present in the terminal's field, as:

$$\frac{k}{k_{max}} = \sqrt{\frac{\frac{VC1}{I} - \frac{VC1_{off\text{-}load}}{I_{off\text{-}load}}}{\frac{VC1_{max}}{I_{max}} - \frac{VC1_{off\text{-}load}}{I_{off\text{-}load}}}}. \quad \text{(formula 14)}$$

By applying formula 11 to maximum coupling $k_{max}$ and by combining formulas 1, 2, and 6 to express coefficient $a_{max}^2$, one may write:

$$\frac{X2 \cdot R2 \cdot C2}{L2} = \frac{\frac{VC1_{off\text{-}load}}{I_{off\text{-}load}} - \frac{VC1_{max}}{I_{max}}}{Vg \cdot \left(\frac{1}{I_{max}} - \frac{1}{I_{off\text{-}load}}\right)}. \quad \text{(formula 15)}$$

Now, for a given transponder family, ratio $$\frac{X2 \cdot R2 \cdot C2}{L2}$$

is constant. Further, excitation voltage Vg of the terminal's oscillating circuit is determined. A constant K2 respecting the following relation can thus be defined:

$$K2 = -Vg \cdot \frac{X2 \cdot R2 \cdot C2}{L2} = \frac{\frac{VCI_{max}}{I_{max}} - \frac{VCI_{off\text{-}load}}{I_{off\text{-}load}}}{\frac{1}{I_{max}} - \frac{1}{I_{off\text{-}load}}}. \quad \text{(formula 16)}$$

Above formula 15 can apply to any value of current I and of voltage VC1 (replacing the values at the maximum coupling). Accordingly, having stored, in a learning phase, the off-load voltage and current as well as, for a given transponder family, the same variables at the maximum coupling, the belonging of a transponder present in the field to this family can be deduced from the constant measurements of these variables. It is sufficient to check that the following relation is respected:

$$\frac{\left(\frac{VCI}{I} - \frac{VCI_{off\text{-}load}}{I_{off\text{-}load}}\right) \cdot \left(\frac{1}{I_{max}} - \frac{1}{I_{off\text{-}load}}\right)}{\left(\frac{VCI_{max}}{I_{max}} - \frac{VCI_{off\text{-}load}}{I_{off\text{-}load}}\right) \cdot \left(\frac{1}{I} - \frac{1}{I_{off\text{-}load}}\right)} = 1. \quad \text{(formula 17)}$$

If, conversely, the result is different from one, this means that the reader has a card of another type in its field (for example, a card from another manufacturer).

In the application of the present invention to the case where several cards are likely to be present at the same time in the field, the above checking is not sufficient. The respective participations of the transponders to the apparent impedance (more specifically, to the apparent resistance) on the terminal side must then be summed up. Accordingly, for n transponders present in the terminal's field, one may write, by applying formulas 2 and 3:

$$ZI_{app} = R1 + \sum_{i=1}^{n} a_i^2 \cdot \frac{L2_i}{R2_i \cdot C2_i}. \quad \text{(formula 18)}$$

Considering that the transponders are of the same type, that is, they have the same intrinsic electric characteristics (L2, R2, and C2), above formula 18 becomes:

$$ZI_{app} = R1 + \frac{L2}{R2 \cdot C2} \cdot \sum_{i=1}^{n} a_i^2. \quad \text{(formula 19)}$$

The only term which is then variable is that depending on the coupling between oscillating circuits, and thus on the distance between each transponder and the terminal.

For n cards having different coupling coefficients $k_i$, one may write:

$$\sum_{i=1}^{n} a_i^2 = \frac{\omega^2 \cdot L1 \cdot L2}{Z2^2} \cdot \sum_{i=1}^{n} k_i^2. \quad \text{(formula 20)}$$

As a first approximation, it may be considered that, as seen from the terminal, everything occurs as if it saw n transponders having the same coupling coefficient corresponding to an average coupling coefficient. Accordingly, an average coupling coefficient per card can be defined as being given by the following relation:

$$k_{av}^2 = \sum_{i=1}^{n} \frac{k_i^2}{n}. \quad \text{(formula 21)}$$

This amounts to defining a coefficient $a_{av}$ by the following relation:

$$\sum_{i=1}^{n} a_i^2 = n \cdot a_{av}^2. \quad \text{(formula 22)}$$

It can be considered that, for n cards or transponders present in the terminal's field, current I measured by its current transformer depends on the number of cards and on their respective coupling coefficient expressed as a function of an average coupling coefficient as follows:

$$I = \frac{Vg}{R1 + n \cdot k_{av}^2 \cdot \frac{\omega^2 \cdot L1 \cdot L2^2}{Z2^2 \cdot R2 \cdot C2}}. \quad \text{(formula 23)}$$

Intuitively, it can be seen that if all transponders have the same coupling coefficient with the terminal, that is, if they all are at the same distance, current I decreases with an increase of the number of transponders present in the field. Similarly, for a same current measured in the terminal's oscillating circuit, a decrease in the coupling coefficient of each transponder implies an increase in the number of transponders in the field. In other words, the product of the number of transponders by the square of the average coupling coefficient per transponder can be considered as being constant.

Considering that, in above formula 23, only values Vg, n, and kav are likely to vary for a given terminal and a given family of transponders, and writing this relation, at maximum coupling, for one card and for n cards, the following can be deduced:

$$I_{max(n)} = \frac{Vg}{R1 + n \cdot \left(\frac{k_{av}}{k_{max}}\right)^2 \cdot \left(\frac{Vg}{I_{max(1)}} - R1\right)}, \quad \text{(formula 24)}$$

with $I_{max}(1)$ and $I_{max}(n)$ representing the currents at the maximum coupling respectively for 1 and n cards.

By combining formulas 23 and 24, the following relation is obtained:

$$I_{max(n)} = \frac{1}{\frac{n}{I_{max(1)}} + \frac{1-n}{I_{off\text{-}load}}}. \quad \text{(formula 25)}$$

Now, as previously indicated, the off-load and maximum coupling currents for a card can be measured in a learning phase of the reader (using a sample card for the current at maximum coupling $I_{max(1)}$). Accordingly, the reader is able to calculate the different values of the current at maximum coupling for 2, 3, 4, etc. cards, the maximum number of calculated values being linked to the application and to the maximum number of cards estimated, in absolute, to be likely to be found in the reader's field.

Figure 4:
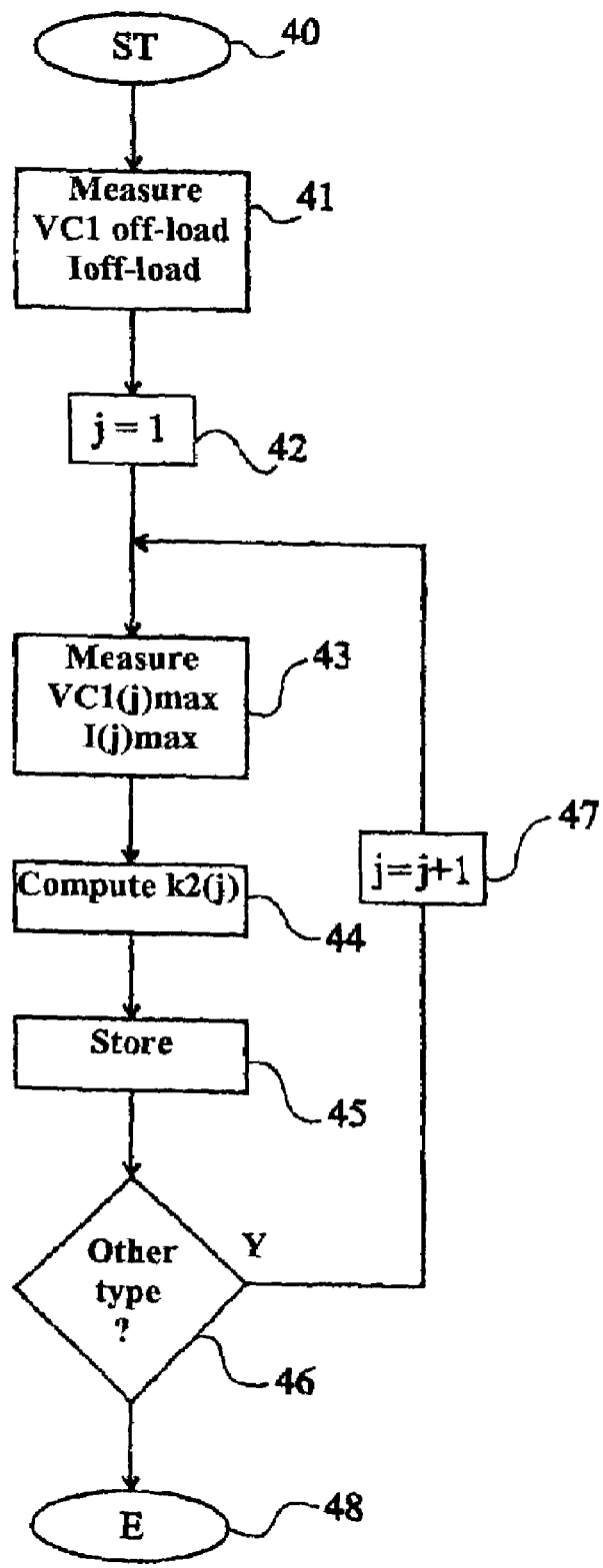
FIG. 4 is a simplified flowchart illustrating an embodiment of a learning phase of the method for evaluating the number of transponders according to the present invention.

FIG. 4 shows a flowchart of an embodiment of a learning and preparation phase according to the present invention.

At the beginning (block 40, ST), the reader is turned on and it is configured by means of its internal computer system for a learning phase.

In a first step (block 41), the off-load voltage and current $VC1_{\textit{off-load}}$ and $I_{\textit{off-load}}$ are measured and stored. These measurements are performed while no card is present in the terminal's field.

In a second step, voltage VC1 and current I at maximum coupling are measured for all the types of cards that the terminal is desired to recognize. In FIG. 4, this is illustrated by the setting of an index j (block 42), followed by the measurements of the variables (block 43), by using a sample card which is placed at a minimum distance from the terminal, ideally at a null distance. Current $I(j)_{max}$ is for example measured by an intensity transformer (35, FIG. 3) while voltage $VC1(j)_{max}$ is measured, for example, across capacitor 31. Based on the variables measured at blocks 41 and 43, the computer means of the reader then calculate (block 44) the constant K2(j) of the considered card family (or any other appropriate value, linked to constant K2) and this characteristic value of the family is stored (block 45). As long as there remain types of cards to be recorded (test 46), the counter is incremented (block 47) and steps 43 to 45 are repeated.

When all the transponder types have been recorded, the learning phase is over (block 48, E) and the reader is able to determine, each time a transponder appears in its field, whether it belongs to an identified type.

Of course, the order of the measurements between the off-load operation and the maximum coupling is arbitrary. The off-load measurements (which are independent from the family or type of cards meant to operate with the terminal) may even be performed independently from the maximum coupling measurements (which can be renewed, for example, to change the type of cards intended for operating with the terminal). Further, any other magnitude representative of ratio K2 may be stored instead of it (for example, value K2/Vg).

Figure 5:
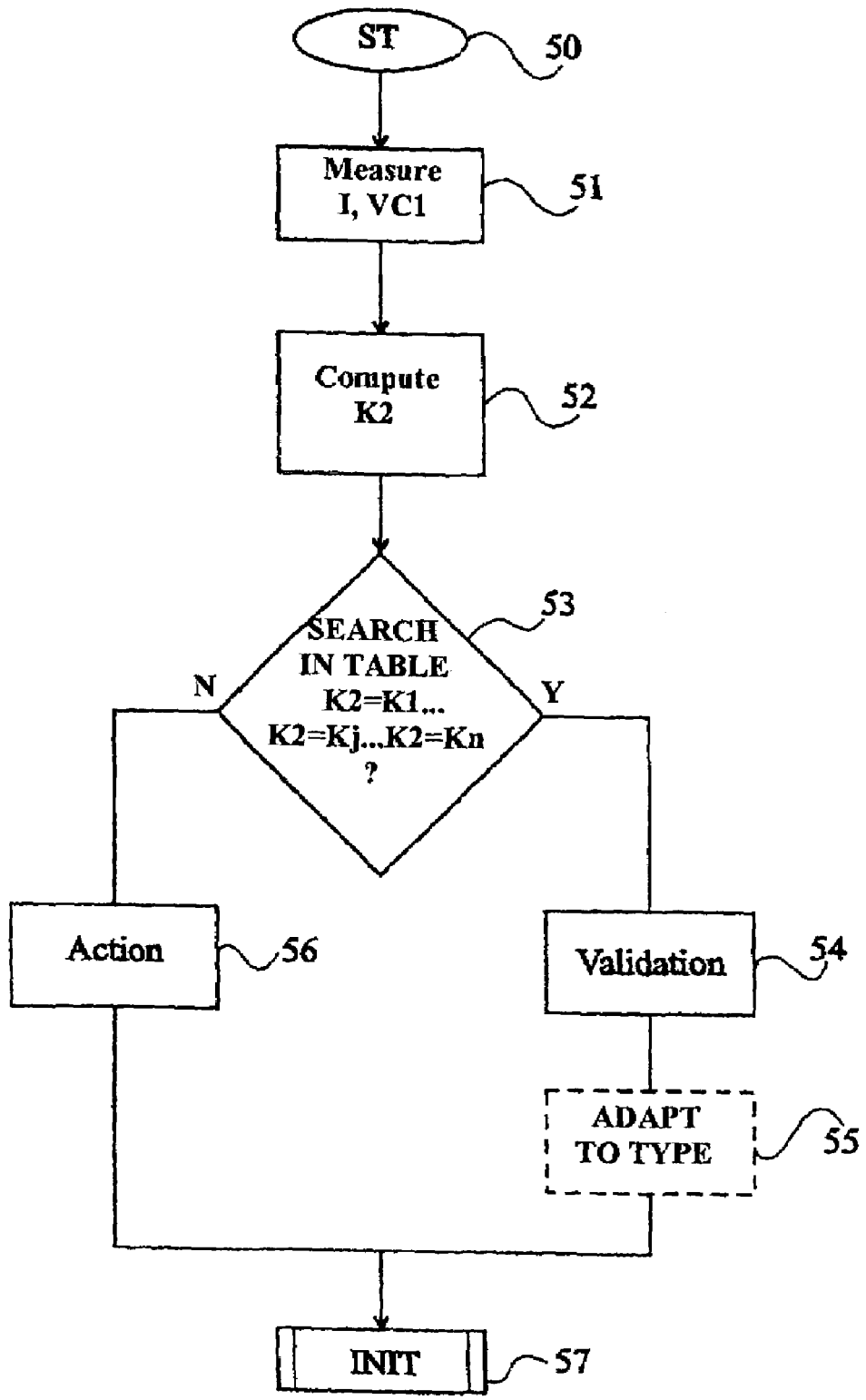
FIG. 5 is a flowchart illustrating, in a simplified manner, a first embodiment of the method for determining the number of transponders in the field of a terminal according to the present invention.

FIG. 5 shows a simplified flowchart of an embodiment of the method of card type identification according to the present invention.

According to this embodiment, after the end (block 48, FIG. 4) of the learning phase, the reader switches to a conventional stand-by operating mode where it transmits periodic requests to monitor the occurrence of a transponder in its field.

As soon as the reader has detected the possible presence of a transponder, it starts a determination phase such as illustrated in FIG. 5. After a step (block 50, ST) of program initialization, the current values of current I and of voltage VC1 are measured (block 51). Then, the characteristic constant K2 of the current transponder is calculated (block 52). It is then searched (block 53), in the set of values stored in the learning phase, whether one of the constants corresponds to the current value.

If such is the case, the recognition of the current card is validated (block 54). This validation may come along with various actions. For example, the reader may be adapted to the card type (block 55), as will be seen hereafter, or the validation may be considered as a first reader access control.

Afterwards, a conventional anti-collision method is applied (block 57, illustrating the initialization INIT of a transmission).

If a transponder is not recognized, there again, several actions (block 56) may be taken according to the purpose that is desired to be given to the recognition. For example, the exchanges may be stopped by blocking the request procedure (block 57), then considering that the transponder is a pirate transponder. In the case where the present invention is only implemented to adapt the reader to the transponder type, no specific adaptation is provided. Afterwards, the conventional anti-collision method is applied (block 57).

An advantage of the present invention is that it enables a first access control to a reader which is not based on a demodulation of a data message but on the intrinsic electric characteristics of the transponder. Since the signature used is of "electric" type, it is much more difficult to falsify (capacitance C2 and equivalent resistance R2 originate from elements integrated in a chip). Further, considering that the intrinsic differences of transponders according to their type are not sufficient, it can easily be provided, upon manufacturing of the transponders, to slightly modify their components per type to give them different signatures.

Another advantage of the present invention is that this access control can be implemented before the beginning of a communication and anti-collision process initialization. In practice, the measurements and calculations necessary to the present invention are very fast with the computer means provided in the reader.

Another advantage of the present invention is that it enables, if necessary, adapting the reader to the transponder with which it must communicate before implementing the transmission initialization process. For example, a transponder type may be dedicated to a coupling type (remote or close) with a reader. If the reader can accept several operating modes according to the coupling relation with the transponder, the reader and, more specifically, its oscillating circuit, can be adapted to the dedicated operating mode of the transponder.

Indeed, it can be deduced from the learning phase whether the transponder type is dedicated to an operation in extreme closeness or in remote coupling. For example, how to structurally dedicate a transponder to an operation respectively in extreme closeness and in remote coupling is described in European patent applications no. 00410077.2 and 00419078.0 of the applicant which are incorporated herein by reference. This translates in the position of optimal coupling point $k_{opt}$ of the transponder with respect to maximum coupling $k_{max}$, where optimal coupling $k_{opt}$ is defined as being the coupling position where the voltage recovered by the transponder is maximum. It is known that if $k_{opt} < k_{max}$, the transponder is dedicated to an operation in extreme closeness. If $k_{opt} < k_{max}$, the transponder is dedicated to an operation in remote coupling. Now, the ratio between these two coupling coefficients depends on current I off-load and at maximum coupling. Indeed, as a first approximation, one may write, by combining formulas 1, 2, and 3 in which X2 is, at first order, close to zero:

$$\frac{k_{opt}}{k_{max}} = \frac{1}{\sqrt{\frac{I_{\textit{off-load}}}{I_{max}} - 1}} \cdot \qquad \text{(formula 26)}$$

Accordingly, based on the learning phase, it is known to determine whether the transponder type is dedicated to an operation in extreme closeness or in remote coupling.

On the other hand, the position of capacitor C2 of the transponder with respect to the value of this capacitor at the tuning C2tun, that is, when the transponder's oscillating circuit is tuned on the frequency of the remote supply carrier, can be deduced from ratio K2/Vg.

Indeed, for a card present in the field of a reader, one may write:

$$\frac{X2 \cdot R2 \cdot C2}{L2} = R2 \cdot \left(\omega \cdot C2 - \frac{1}{\omega \cdot L2}\right). \quad \text{(formula 27)}$$

Based on this expression and on formula 16, one may write:

$$C2 = \frac{1}{\omega^2 \cdot L2} + \frac{\frac{VCl_{off-load}}{I_{off-load}} - \frac{VCl_{max}}{I_{max}}}{R2 \cdot Vg \cdot \omega^2 \cdot \left(\frac{1}{I_{max}} - \frac{1}{I_{off-load}}\right)}. \quad \text{(formula 28)}$$

Now, when the transponder is tuned on the remote supply carrier frequency, there is:

$$\omega^2 \cdot C2_{tun} = \frac{1}{\omega^2 \cdot L2}. \quad \text{(formula 29)}$$

Accordingly, term $$\text{term} \frac{\frac{VCl_{off-load}}{I_{off-load}} - \frac{VCl_{max}}{I_{max}}}{R2 \cdot Vg \cdot \omega \cdot \left(\frac{1}{I_{max}} - \frac{1}{I_{off-load}}\right)}$$

translates the transponder's detuning.

The following may thus be written:

$$C2 = C2_{tun} - \frac{K2}{R2 \cdot Vg \cdot \omega}, \quad \text{(formula 30)}$$

where term $$\frac{K2}{Vg \cdot \omega}$$

gives an image proportional to the transponder's detuning. The above may of course be translated in terms of quality factor Q2 of the transponder. In this case, ratio K2/Vg gives an image proportional to the quality factor variation.

Afterwards, by measuring the current ratio K2/Vg of a transponder in the reader's field, an information about the value of the transponder's capacitance as compared to its theoretical tuning capacitance corresponding to the ratio K2/Vg stored in the learning phase is obtained.

In the case of a transponder dedicated to an operation in extreme closeness and the quality factor of which is smaller than the quality factor at the tuning, the quality factor of the reader's oscillating circuit can be decreased (for example, by increasing the values of C1 and/or R1). The transmission rate is thus increased. Further, by increasing the value of resistance R1, the transmission power of the terminal, and thus its remote supply range, is reduced, which enhances an operation in extreme closeness.

If, still in the case of a transponder dedicated to extreme closeness, quality factor Q2 is greater than the quality factor at the tuning, the value of R1 may be increased to reduce the transmission power and to decrease the remote supply range.

In the case of a transponder dedicated to a remote coupling operation, the terminal can adapt its values of C1 and R1 according to whether the transponder has a relatively low or high transmission flowrate.

More generally, advantage can be taken from the learning phase and from the use of a reference transponder to have said transponder transmit to the terminal information relative to its operation (for example, operation in extreme closeness or in remote coupling, back modulation flowrate, minimum voltage level, memory size and content type, identification type, etc.). All these characteristics are then associated to the type of transponders stored in the terminal. For example, this avoids transmitting this information at the beginning of each communication between a transponder and the terminal.

Generally, all the actions taken by the terminal can be adapted according to the information previously gathered by the terminal in the learning phase with a reference transponder of the concerned family. The information extracted from the "electric" identification can in particular be combined with "software" information transmitted by the transponder to the terminal.

In a preferred application of the present invention, the number of transponders present in the terminal's field is also evaluated. For this purpose, additional calculations are performed in the learning phase. However, as will appear from the following description, the measurements taken into account are the same as those performed to determine the type of transponders.

Figure 6:
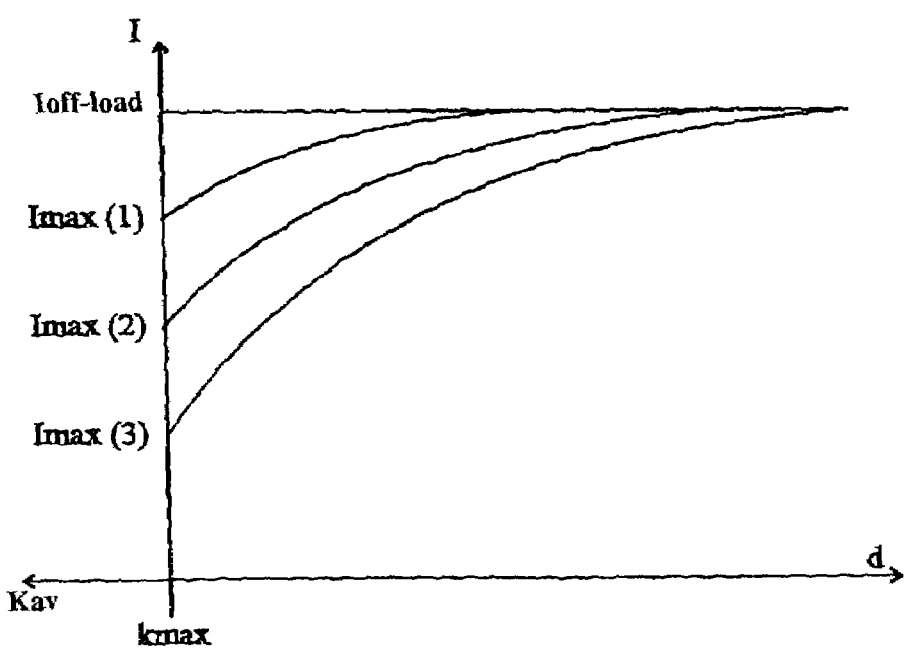
FIG. 6 shows characteristics of current variation in the oscillating circuit of a terminal of the present invention with respect to the distance at which are located one or several transponders, to illustrate a learning phase of the method of evaluating the number of transponders according to the present invention.

FIG. 6 illustrates an example of a network of curves of current I in the oscillating circuit according to distance d or, more specifically, to the average coupling coefficient per card in the reader's field. The average coupling scale decreases towards the right while the distance scale increases towards the right.

As illustrated by the curve network of FIG. 6, the maximum current at maximum coupling kmax, that is, at a null distance, decreases as the number of cards in the terminal's field increases. Further, all the curves have substantially the same shape and join the horizontal shape of the off-load current as the distance increases (or the decrease of the average coupling coefficient per card). It should be noted that the curves do not cross one another.

Accordingly, by measuring, upon operation of the reader, the current in its oscillating circuit, the minimum number of cards in the field can be determined by comparing this measured current to the different values calculated during the learning phase. It should be noted that, as compared to the curves of FIG. 6, the calculations of the learning phase do not lead to really plotting the curve network, but merely to calculating the different possible maximum currents.

To calculate the minimum number of curves, an additional step (not shown) is provided in the learning phase (FIG. 4), in which a set of current values corresponding to the maximum coupling for several cards is calculated. These values of $I_{max}(n>1)$ correspond to those illustrated in FIG. 6, the maximum number of calculated values depending on the application.

The reader is then able to determine, each time one or several transponders of the same type appear in its field, the minimum number of transponders. This number will enable adapting the request procedures and, more specifically, adapting the number of anti-collision steps to be implemented upon initialization of a transmission.

Indeed, the test corresponding to above formula 17 can be generalized to n cards of the same type. In this case, the measured values VC1 and I1 correspond to the contribution of the n cards and the test to be performed is the following:

$$\frac{\left(\frac{VC1}{I} - \frac{VC1_{off\text{-}load}}{I_{off\text{-}load}}\right)}{\left(\frac{1}{I} - \frac{1}{I_{off\text{-}load}}\right)} = K2. \quad \text{(formula 31)}$$

This test is performed instead of test 53 of FIG. 5. If the result is incorrect, this means that several cards of different types are present. Their respective types then cannot be determined based on the mere current and voltage measurements. In this case, the conventional software request, initialization and anti-collision method must then be used (FIG. 2).

If the result is correct, this means that one or several cards of the same type are present. A method of evaluation of the number of cards according to the preferred embodiment of the present invention can then be implemented, to find not only the type, but also the minimum and maximum numbers of cards present in the reader's field.

Validation step 54 (FIG. 5) then corresponds to a determination, based on the values previously calculated in the learning phase, of minimum number nmin of transponders present in the terminal's field.

For example, if the measured current I is included between off-load current $I_{off\text{-}load}$ and the maximum current for one card $I(j)_{max(1)}$ (corresponding to measurement $I(j)_{max}$ of the learning phase, FIG. 4), two cases are possible. Either there is a single card in the reader's field and this card has a given coupling k (smaller than $k_{max}$). Or there are n cards in the reader's field, which all individually have couplings k smaller than coupling k of the first case.

If the measured current is between two maximum current values for n and n+1 cards, it is certain that there are at least n cards in the reader's field. There may however be more than n+1 cards if the average coupling per card is smaller than in the case where only n cards are present.

A number $n_R$ of request cycles can then be chosen in the anti-collision method, which is a function of this minimum number. Based on this number, a conventional anti-collision process is then applied.

A first advantage that already appears with the simplified embodiment such as described hereabove is that by knowing the minimum number of cards, the number of anti-collision requests can already be adjusted and time is already saved with respect to the conventional method.

Figure 7:
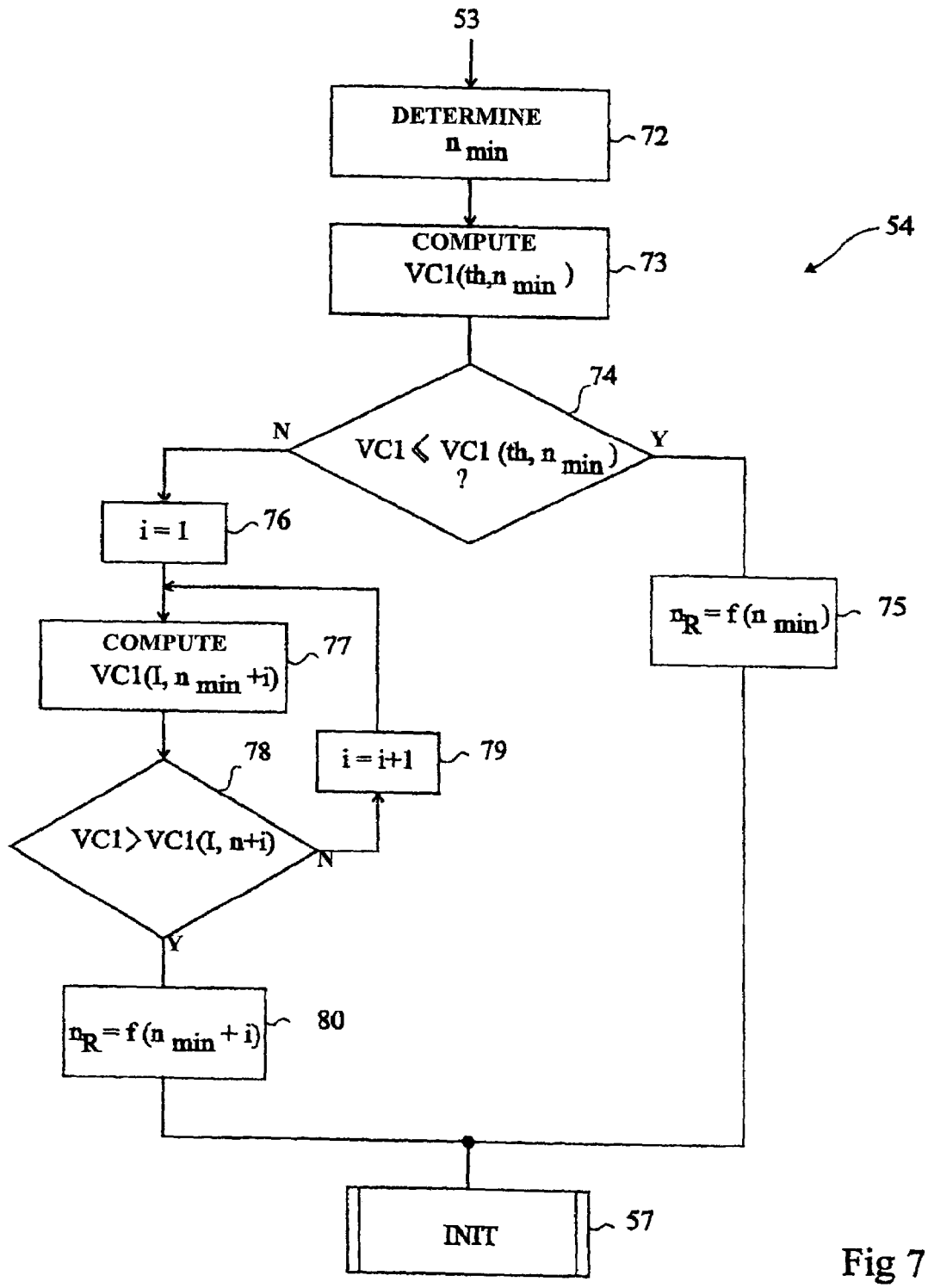
FIG. 7 is a simplified flowchart of a step of the method of the present invention illustrated by FIG. 5 according to a second embodiment of the method of the present invention.

FIG. 7 shows a simplified flowchart of a preferred embodiment of the present invention in which the determination of the number of request phases of the transmission initialization method is refined. The flowchart of FIG. 7 overlaps that of FIG. 5, for example instead of validation step 54.

The minimum number $n_{min}$ is first determined (block 72) as in the simplified method.

Then, a set of values $VC1(th,n_{min})$ corresponding to a set of theoretical values of the voltage across capacitor C1 (element 31, FIG. 3) are calculated (block 73) for each of the minimum numbers of cards likely to be present in the terminal's field.

The calculation of these theoretical values is performed as follows.

Due to the phase regulation loop provided on the reader side, for each previously-determined minimum number of cards, the theoretical voltage across the reader's capacitive element can be calculated, then the maximum number of cards present in the field can be deduced therefrom.

Indeed, formula 16 previously established for one card remains valid for any value of current I, of voltage VC1, and of the coupling. Accordingly, the current voltage VC1 can be expressed as:

$$VC1 = \left(K2 \cdot \left(\frac{1}{I} - \frac{1}{I_{off\text{-}load}}\right) + \frac{VC1_{off\text{-}load}}{I_{off\text{-}load}}\right) \cdot I. \quad \text{(formula 32)}$$

Constant K2 has been calculated and memorized in the learning phase based on the measured values (blocks 41 and 43, FIG. 4).

Equation 32 hereabove remains valid for several cards present in the terminal's field. Accordingly, based on the current measurement of the current (block 51, FIG. 5) and on the determination of the minimum number of cards $n_{min}$ (block 72), a theoretical value $VC1(th,n_{min})$ of voltage VC1 across capacitive element 31 can be deduced for nmin cards, by applying the following relation that is deduced from formula 32:

$$VC1_{(th,n_{min})} = \left(K2 \cdot \left(\frac{1}{I} - \frac{1}{I_{off\text{-}load}}\right) + \frac{VC1_{off\text{-}load}}{I_{off\text{-}load}}\right) \cdot I. \quad \text{(formula 33)}$$

It is then possible to compare (block 74) the current value of the voltage measured across element 31 to this theoretical value calculated for the previously-determined minimum area.

If the measured voltage is smaller than or equal to the theoretical value calculated for number $n_{min}$, this means that the number of cards present in the field is equal to the minimum number. In this case, number $n_R$ of request sequences of the anti-collision process is chosen (block 75) based on this number $n_{min}$, which is known to now correspond to the exact number of transponders.

If the measured value is greater than the theoretical value, this means that there are more than $n_{min}$ cards in the terminal's field.

It is then proceeded to another calculation phase including determining, based on the voltage measurement, the maximum number of cards present in the field. For this purpose, the calculation of the voltage VC1 that should be obtained to correspond to the current I measured for an increasing number nmin+i is iteratively performed. Indeed, since the minimum number of cards has been determined based on the current measurement, and since it is known that the real number of cards does not correspond to this minimum number, the number of cards in the terminal's field is greater than the minimum number but the average coupling coefficient of these cards is smaller than the maximum coupling coefficient. In the opposite case, the measured current would have provided a greater minimum number of cards.

As illustrated by the example of embodiment of FIG. 7, a counter representing the additional increment i with respect to number $n_{min}$ of cards is initialized (block 76). By having set variable i to 1, a first voltage value VC1 is calculated for the measured current I and the minimum number of cards +1. The relation applied for the calculation of this value (block 77) is obtained in the following way which will be better understood in relation with FIG. 8.

Figure 8:
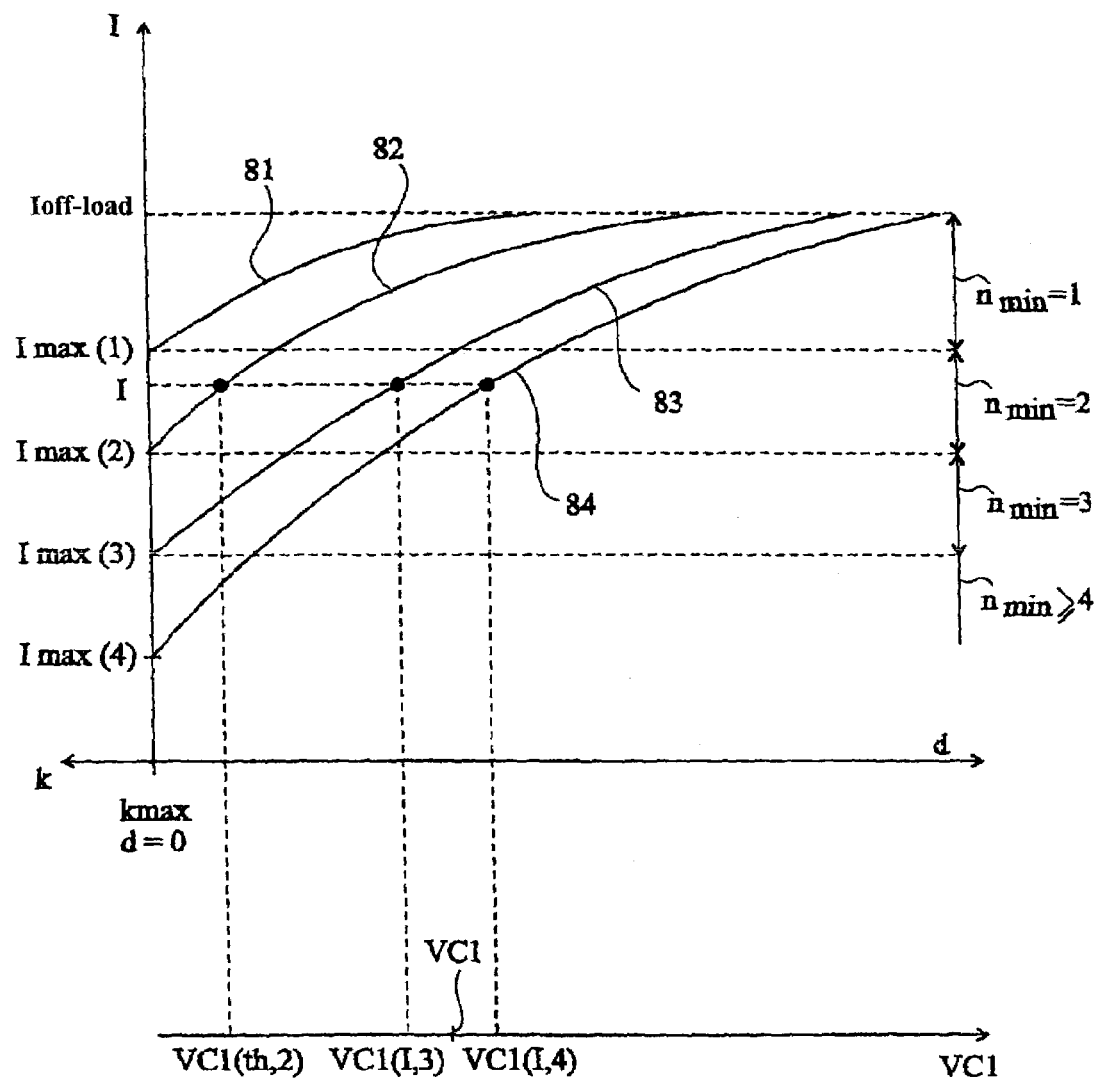
FIG. 8 shows a characteristic of the current in the terminal's oscillating circuit according to the coupling coefficient, and a characteristic of the voltage across the capacitor of this oscillating circuit, to illustrate the second embodiment of the method of the present invention.

FIG. 8 shows an example of shapes of current I in the oscillating circuit according to distance (or to coupling coefficient k) associated with a scale of values of voltage VC1 across capacitive element 31.

As illustrated by this drawing, the calculations (block 44, FIG. 4) performed during the learning phase enable determining points of origin of curves 81, 82, 83, and 84 that are all located at the maximum coupling coefficient kmax. Each curve corresponds to an increasing number of cards for a decreasing current. The measurement (block 41) of the off-load current defines the asymptote of the different curves. The plotting of the currents of FIG. 8 is to be compared with the plotting of FIG. 6. The determination of the different points on the current axis, at the position of the maximum coupling coefficients (or null distance) enables determining areas (horizontal in the representation of the drawing) where the minimum number of cards is different from one area to the other. The measurement of voltage VC1 enables, afterwards, determining the maximum number of cards.

The calculation (block 73) of the theoretical voltage value, for the minimum number of cards obtained at value I of the measured current, determines an intersection point which, in the example shown in FIG. 8, is on curve 82 representing the shape of two cards.

The calculation performed at block 77 of FIG. 7 corresponds to determining the points of intersection of the line of measured current I with curves 83 and 84 corresponding to greater numbers of cards.

After having calculated a first value VC1(I,3) for a unity increment i, the obtained value is compared with the measured value VC1 (block 78). As long as measured value VC1 is not greater than the calculated value, increment i is increased (block 79) and the calculation is resumed for a greater number of cards (value VC1(I,4)). In the example of FIG. 8, it is assumed that the measured value VC1 is included between the values for three and four cards. Taking the measured current into account, this means that the number of transponders is at most four, and thus included between 2 and 4. It is then possible to set (block 80) the number of requests of the anti-collision process to this maximum number (or to the maximum number +1 for reasons of determination security).

Then, whether the number of requests has been determined by block 75 or by block 80, a conventional request process is performed, taking this number into account (block 57).

It should be noted that, although the representation of FIG. 8 illustrates complete theoretical curves, the calculations necessary to the implementation of the present invention only concern points of these curves that, in practice, need not be precisely determined.

The calculation of value VC1(I,$n_{min}$+i) is performed based on the following formula:

$$VC1_{(I, n_{min}+i)} = \left( \frac{n_{min}+i}{n_{min}} \cdot \left( \frac{VC1_{(th, n_{min})}}{I} - \frac{VC1_{off\text{-}load}}{I_{off\text{-}load}} \right) + \frac{VC1_{off\text{-}load}}{I_{off\text{-}load}} \right) \cdot I, \quad \text{(formula 34)}$$

which is deduced from the application of formula 14 to an average coupling coefficient per card in the minimum number area, considering that, for a given measured current, the average coupling coefficient is given by the following relation:

$$k^2(I, n+i) = \frac{n_{min}+i}{n_{min}} \cdot k^2(I, th, n_{min}), \quad \text{(formula 35)}$$

where k(I,th,$n_{min}$) designates the average coupling coefficient per card corresponding to value nmin.

An advantage of the present invention is that it is now possible to determine at least the minimum number of transponders present in the field.

In the preferred embodiment illustrated hereabove, even the exact number or, at least a maximum number of transponders present in the field is determined. Knowing these numbers enables adapting the initialization algorithms of a communication when at least one transponder acknowledges an interrogation request transmitted by a terminal.

The fact of knowing a priori the number of cards in the reader's field enables evaluating the optimal number of request phases. The exchange time dedicated to the anti-collision protocol that must enable either selecting a card from among several cards presented at the same time in front of the reader, or identifying the cards in the reader's field, or allowing a selection sequencing of the different cards with which the reader must communicate, can thus be optimally reduced.

The adaptation of the expectable number of cards in the reader's field is performed, according to the present invention, as soon as a transponder acknowledges a request from the terminal. Initially, it can be provided to arbitrarily or conventionally set this number if a predetermined number is required to implement the request process.

As soon as the reader detects the presence of a transponder, it performs the procedure of determination of the number of transponders by using the data calculated during the learning. For the rest, a conventional request, anti-collision, and initialization process can be used.

Number $n_R$ of requests does not necessarily correspond to the maximum or exact number determined by the present invention, but is a function of this number (for example, product or quotient by a predetermined coefficient, sum or subtraction of a predetermined number).

Of course, the present invention is likely to have various alterations, modifications, and improvements which will readily occur to those skilled in the art. In particular, the practical implementation of the present invention based on the functional indications given hereabove is within the abilities of those skilled in the art. It should only be noted that they will generally resort to usual techniques of programming of digital processing circuits present in transponder read/write terminals. Thus, since the present invention basically implements calculation processes, it may be used with minor modifications of a conventional terminal having current and voltage information in the terminal's oscillating circuit.

Among the applications of the present invention are contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A terminal for generating a high-frequency electromagnetic field by means of an oscillating circuit, adapted to cooperating with at least one transponder when said transponder enters this field, and including:
   means for regulating the signal phase in the oscillating circuit with respect to a reference value; and
   means for detecting, based on a measurement of a current in the oscillating circuit and on a measurement of a voltage across a capacitive element of the oscillating circuit, an electric signature of a transponder.

2. The terminal of claim 1, wherein the electric signature enables determining a type to which the transponder belongs from among a set of types identified by characteristic manufacturing parameters.

3. The terminal of claim 1 including means for comparing the signature of a transponder having entered its field with at least one signature sample memorized during a learning phase.

4. The terminal of claim 1, including means for determining and storing characteristic information relative to the voltages across the capacitive element of its oscillating circuit and to the currents in this oscillating circuit, in several determined configurations of the distance separating a reference transponder from the terminal, and for taking into account this characteristic information to determine the transponder's signature.

5. The terminal of claim 4, wherein said characteristic information includes:
   the voltage across the capacitive element when no transponder is present in the field of the terminal;
   the voltage across the capacitive element when a transponder is in a relation of maximum closeness with the terminal;
   the current in the oscillating circuit when no transponder is present in the terminal's field; and
   the current in the oscillating circuit when a transponder is in a relation of maximum closeness with the terminal.

6. The terminal of claim 1 wherein the signature detection is performed without interpreting any data message carried by the high-frequency field.

7. The terminal of claim 1, including means for evaluating, based on the measurement of the current in the oscillating circuit, the minimum number of transponders present in the field.

8. The terminal of claim 7, further including means for, based on the measurement of the voltage across the capacitive element of the oscillating circuit, evaluating the maximum number of transponders present in the terminal's field.

9. A method for establishing at least one communication between a terminal of generation of a high-frequency magnetic field and an electromagnetic transponder comprising determining a type of a transponder from among a set of types identified by characteristic electric parameters of the transponders linked to a sizing of an inductive resistor and/or a capacitor of oscillating circuits of the transponders, before exchanging any data message between the transponder and the terminal.

10. The method of claim 9, wherein said determination includes comparing the current measured in an oscillating circuit of the terminal and a voltage across a capacitive element of the oscillating circuit with previously calculated and stored values to establish the set of identified types.

11. The method of claim 9 including periodically sending a request sequence until at least one transponder entering the field sends an acknowledgement, and evaluating based on the current measurement a minimum number of transponders likely to be present in the field.

12. The method of claim 11, further including, based on the evaluation of the minimum number and on a measurement of the voltage, evaluating the maximum number of transponders likely to be present in the terminal's field.

13. The method of any of claim 9, wherein the method is applied to a terminal for generating a high-frequency electromagnetic field by means of an oscillating circuit, adapted to cooperating with at least one transponder when said transponder enters the electromagnetic field, the terminal including means for regulating the signal phase in the oscillating circuit with respect to a reference value and means for detecting, based on a measurement of a current in the oscillating circuit and on a measurement of a voltage across a capacitive element of the oscillating circuit, and electric signature of a transponder.

14. A terminal for operation with at least one electromagnetic transponder, comprising:
   an oscillating circuit for generating a high-frequency electromagnetic field; and
   a circuit configured to detect an electrical signature of a transponder in the electromagnetic fields,
   wherein the electrical signature is indicative of one or more electrical characteristics linked to a sizing of an inductive resistor and/or a capacitor of an oscillating circuit of the transponder.

15. A terminal as defined in claim 14, wherein the circuit is configured to detect the electrical signature based on a measurement of a current in the oscillating circuit and on a measurement of a voltage across a capacitive element of the oscillating circuit.

16. A terminal as defined in claim 15, wherein the circuit is configured for comparing the electrical signature of the transponder in the electromagnetic field with at least one stored signature.

17. A terminal as defined in claim 15, further comprising means for regulating the signal phase in the oscillating circuit with respect to a reference value.

18. A terminal as defined in claim 15, further comprising means for determining and storing characteristic values of voltages across the capacitive element and currents in the oscillating circuit in at least two configurations of distance separating a reference transponder from the terminal, and for using the stored characteristic values to determine the electrical signature of the transponder.

19. A terminal as defined in claim 18, wherein the characteristic values include:

a voltage across the capacitive element when no transponder is present in the electromagnetic field of the terminal;

a voltage across the capacitive element when the reference transponder is in a relation of maximum closeness to the terminal;

a current in the oscillating circuit when no transponder is present in the electromagnetic field of the terminal; and a current in the oscillating circuit when the reference transponder is in a relation of maximum closeness to the terminal.

20. A terminal as defined in claim 15, further including means for evaluating a minimum number of transponders present in the electromagnetic field, based on measurement of the current in the oscillating circuit.

21. A terminal as defined in claim 22, further including means for evaluating a maximum number of transponders present in the electromagnetic field, based on measurement of the voltage across the capacitive element of the oscillating circuit.

22. A terminal as defined in claim 14, wherein the circuit is configured to determine, based on the detected electrical signature, a transponder type to which the transponder belongs from a set of transponder types identified by characteristic manufacturing parameters.

23. A terminal as defined in claim 14, wherein the electrical signature of the transponder is detected without interpreting any data message carried by the high-frequency electromagnetic field.

24. A method for operating a terminal with at least one transponder, comprising:

generating a high-frequency electromagnetic field with an oscillating circuit; and detecting an electrical signature of a transponder in the electromagnetic field, wherein the electrical signature is indicative of one or more electrical characteristics linked to a sizing of an inductive resistor and/or a capacitor of an oscillating circuit of the transponder.

25. A method as defined in claim 24, wherein detecting the electrical signature of the transponder comprises measuring a current in the oscillating circuit and measuring a voltage across a capacitive element of the oscillating circuit.

26. A method as defined in claim 24, wherein detecting the electrical signature of the transponder includes determining a transponder type to which the transponder belongs from a set of transponder types identified by characteristic manufacturing parameters.

27. A method as defined in claim 24, wherein detecting the electrical signature of the transponder includes comparing the detected electrical signature with at least one stored signature.

28. A method as defined in claim 24, further comprising regulating the signal phase in the oscillating circuit with respect to a reference value.

29. A method as defined in claim 24, further comprising determining and storing characteristic values of voltages across the capacitive element of the oscillating circuit and currents in the oscillating circuit in at least two configurations of distance separating a reference transponder from the terminal and using the stored characteristic values to determine the electrical signature of the transponder.

30. A method as defined in claim 29, wherein determining and storing characteristic values includes:

determining and storing a voltage across the capacitive element when no transponder is present in the electromagnetic field;

determining and storing a voltage across the capacitive element when the reference transponder is in a relation of maximum closeness to the terminal;

determining and storing a current in the oscillating circuit when no transponder is present in the electromagnetic field; and determining and storing a current in the oscillating circuit when the reference transponder is in a relation of maximum closeness to the terminal.

31. A method as defined in claim 24, wherein detecting the electrical signature of the transponder is performed without interpreting any data message carried by the electromagnetic field.

32. A method as defined in claim 24, further including evaluating the minimum number of transponders present in the electromagnetic field, based on measurement of the current in the oscillating circuit.

33. A method as defined in claim 32, further including evaluating the maximum number of transponders present in the electromagnetic field, based on measurement of the voltage across the capacitive element of the oscillating circuit.

34. An apparatus for establishing communication between a terminal and an electromagnetic transponder, comprising:

an oscillating circuit for generating a high-frequency electromagnetic field; and a circuit configured to determine a type of transponder in the electromagnetic field from a set of transponder types identified by characteristic electric parameters of the transponders linked to a sizing of an inductive resistor and/or a capacitor of oscillating circuits of the transponders, before exchanging any data message between the transponder and the terminal.

* * * * *

UNITED STATES PATENT AND TRADEMARK OFFICE
CERTIFICATE OF CORRECTION

PATENT NO. : 7,046,121 B2  Page 1 of 1
APPLICATION NO. : 10/343775
DATED : May 16, 2006
INVENTOR(S) : Luc Wuidart It is certified that error appears in the above-identified patent and that said Letters Patent is hereby corrected as shown below:

Formulas 12 and 13 in column 10 should read as shown below $$\frac{a^2 \cdot X2}{a_{max}^2 \cdot X2} = \frac{\dfrac{VCl_{off\text{-}load}}{I_{off\text{-}load}} - \dfrac{VCl}{I}}{\dfrac{VCl_{off\text{-}load}}{I_{off\text{-}load}} - \dfrac{VCl_{max}}{I_{max}}} \qquad \text{(formula 12)}$$

$$\frac{a^2 \cdot X2}{a_{max}^2 \cdot X2} = \frac{k^2}{k_{max}^2} \qquad \text{(formula 13)}$$

Signed and Sealed this

Twenty-second Day of August, 2006

JON W. DUDAS
*Director of the United States Patent and Trademark Office*